United States Patent Office 3,458,577
Patented July 29, 1969

1

3,458,577
6-AMINO-6,7,8,9-TETRAHYDRO-5H-
BENZOCYCLOHEPTEN-5-OLS
Eugene E. Galantay, Morristown, N.J., assignor to
Sandoz Inc., Hanover, N.J.
No Drawing. Filed June 23, 1966, Ser. No. 559,707
Int. Cl. C07c 87/40
U.S. Cl. 260—571  9 Claims

ABSTRACT OF THE DISCLOSURE

The compounds are 6-amino-6,7,8,9-tetrahydro-5H-benzocyclohepten-5-ols, which may have a phenyl or p-chlorophenyl substituent at the 9-position and may have lower alkoxy substituents at any of the 2- or 3-positions, and their pharmaceutically acceptable salts, e.g., 6-amino-2,3-dimethoxy-6,7,8,9-tetrahydro-5H - benzocyclohepten-5-ol. The compounds are useful pharmacologically.

This invention relates to bicyclic compounds. In particular, the invention pertains to substituted benzocycloheptenes and methods for preparing the same. The invention also relates to intermediates which are useful in preparing the above compounds.

The novel benzocycloheptenes of the present invention may be represented structurally as follows:

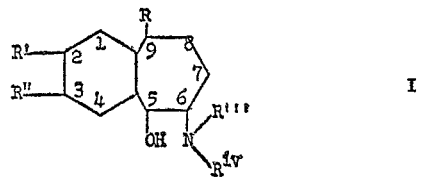

I wherein
R represents hydrogen; phenyl; or p-chlorophenyl;

2

R' and R" each represent hydrogen or lower alkoxy, preferably containing from 1 to 4 carbon atoms, e.g., methoxy, ethoxy, propoxy and butoxy; and
R''' and R$^{iv}$ each represent hydrogen or lower alkyl, preferably containing from 1 to 4 carbon atoms, e.g., methyl, ethyl, propyl and butyl.

The above compounds (I) are prepared by nitrosation of 6,7,8,9-tetrahydro-5H-benzocyclohepten-5-one or an appropriately substituted derivative thereof to form the corresponding 6-isonitroso-6,7,8,9-tetrahydro-5H-benzocyclohepten-5-one and then reducing the latter in a solvent system which also serves as an acylating medium to form the corresponding 6-acylamino-6,7,8,9-tetrahydro-5H-benzocyclohepten-5-one. The latter is then either (1) hydrolyzed to form the corresponding 6-amino-6,7,8,9-tetrahydro-5H-benzocyclohepten-5-one (as an acid addition salt) and the latter reduced to yield predominantly the trans form of the corresponding 6-amino-6,7,8,9-tetrahydro-5H-benzocyclohepten-5-ol (as a salt) or (2) first reduced to form the corresponding 6-acylamino-6,7,8,9-tetrahydro-5H-benzocyclohepten-5-ol and the latter hydrolyzed to yield predominantly the cis form of the corresponding 6-amino-6,7,8,9 - tetrahydro-5H-benzocyclohepten-5-ol (as a salt). The resulting compounds are then alkylated to form the corresponding compounds of Formula I wherein

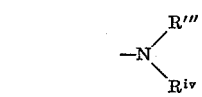

is alkylamino or dialkylamino. The over-all process is illustrated by Reaction Sequence I below.

REACTION SEQUENCE I

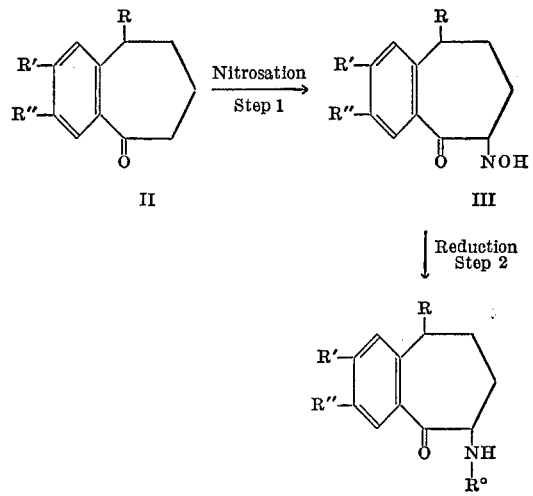

REACTION SEQUENCE I.—Continued

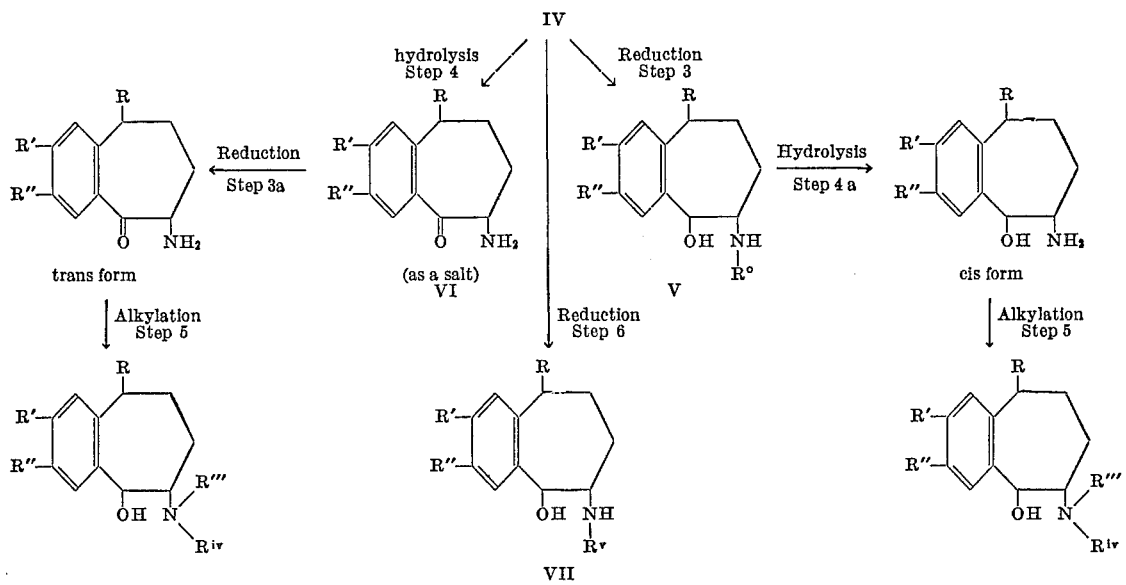

wherein R, R', R", R'" and $R^{iv}$ are as previously defined, $R°$ represents acyl, preferably alkanoyl having from 2 to 4 carbon atoms, e.g., acetyl, propionyl and butyryl, and $R^v$ represents lower alkyl having from 2 to 4 carbon atoms.

As is evident from Reaction Sequence I, Step 1 involves nitrosation of the 6,7,8,9-tetrahydro-5H-benzocyclohepten-5-one (II) to form the corresponding 6-isonitroso derivative (III). This is conveniently effected in conventional manner employing an appropriate inert organic solvent, e.g., benzene, toluene and diethyl ether, and a nitrile, preferably a lower alkyl nitrite such as ethyl nitrite, butyl nitrite or amyl nitrite. Preferably the reaction is carried out at a temperature below room temperature, e.g. 0–5° C. and in the presence of a strong anhydrous acid or base, such as hydrochloric acid or sodium methoxide, respectively. The resulting product (III) is readily recovered in conventional manner. Step 2 involves the conventional reduction, preferably catalytic, of the isonitroso group. The reduction is carried out employing a solvent system which can also serve as an acylating agent so as to form the acylamino derivative (IV) rather than the unstable base. Suitable solvents for this purpose are mixtures of a lower alkanoic acid and its corresponding anhydride, e.g., acetic acid and acetic anhydride, propionic acid and propionic anhydride, and butyric acid and butyric anhydride. Insofar as the reduction is concerned, the usual conditions for effecting reductions of this nature are employed. The resulting acylamino derivative (IV) is then hydrolyzed (Step 4) under acidic conditions to form an acid addition salt of the corresponding 6-amino-6,7,8,9-tetrahydro-5H-benzocyclohepten-5-one (VI) and the latter reduced (Step 3a) to obtain predominantly the trans form of the corresponding 6-amino-6,7,8,9-tetrahydro-5H-benzocyclohepten-5-ol. The hydrolysis is carried out in conventional manner with, e.g., hydrochloric acid, hydrobromic acid and the like and the salt can be recovered employing conventional techniques. Similarly, the reduction (Step 3a) is accomplished in conventional manner employing sodium borohydride or other appropriate reducing agent which is capable of reducing ketones to the corresponding alcohols. The resulting 6 - amino-6,7,8,9-tetrahydro-5H-benzocyclohepten-5-ol (predominantly trans form) salt is readily converted to the corresponidng free base by reaction with an appropriate base in conventional manner. Alternatively, predominantly trans 6-alkylamino-6,7,8,9-tetrahydro-5H-benzocyclohepten-5-ol (VII) can be obtained by reducing (Step 6) the acylamino derivative (IV) in conventional manner with lithium aluminum hydride or other appropriate reducing agent which is capable of simultaneously reducing both the ring carbonyl and acyl group.

The corresponding 6-amino-6,7,8,9-tetrahydro-5H-benzocyclohepten-5-ols of predominantly cis configuration are obtained by first selectively reducing the acylamino derivative (IV) to obtain the corresponding 6-acyl-amino-6,7,8,9-tetrahydro-5H-benzocyclohepten-5-ol (V) (Step 3) and then hydrolyzing the latter (Step 4a). The reduction is carried out in conventional manner employing sodium borohydride or other appropriate agent which is capable of selectively reducing the ring carbonyl without affecting the acyl group attached to such ring. The hydrolysis is carried out in dilute acid medium, such as a dilute aqueous solution of a mineral acid, e.g. 1% hydrochloric acid. The resulting salt is converted to the free base in conventional manner.

The compounds of Formula I wherein each of R', R", R'", and $R^{iv}$ are hydrogen and R is hydrogen or phenyl and can also be prepared by direct reduction of the corresponding isonitroso derivative of Formula III. Such reduction is conveniently effected in a suitable inert organic solvent such as a lower alkanol, e.g., methanol, and in the presence of a strong base, e.g., sodium hydroxide, and a suitable hydrogenation catalyst, such as Raney nickel.

The compounds of Formula I wherein

comprises an alkylamino or dialkylamino group are prepared by conventional alkylation of the corresponding 6-amino-6,7,8,9-tetrahydro-5H-benzocyclohepten-5-ol (Step 5). Alkylation of the predominantly trans form thereof will yield predominantly the trans form of the alkylated derivative while alkylation of the predominantly cis form will produce the alkylated derivative of predominantly cis configuration. Compounds which are substituted at the 6-position with either an alkylamino group or dialkylamino group having the same alkyl substituents are conveniently prepared employing the required stoichiometric amounts of the appropriate alkylating agent. Those compounds which are substituted at the 6-position with dimethylamino are readily prepared by the Eschweiler-Clarke Modification. As for those compounds which are substituted at the 6-position with a dialkylamino group containing different alkyl substituents, alkylation is effected in two steps each of which employs the appropriate alkylating agent. Compounds which are substituted at the 6-position with an alkylamino group can also be prepared by either reduction of the 6-acylamino derivative (IV) as described hereinabove or by reacting the 6-amino-6,7,8,9-tetrahydro-5H-benzocyclohepten-5-ol with benzaldehyde to form the corresponding 6 - benzylideneamino - 6,7,8,9-tetrahydro-5H-benzocyclohepten-5-ol which is then hydrogenated to form the corresponding 6-benzylamino-6,7,8,9-tetrahydro-5H-benzocyclohepten-5-ol. The latter is then alkylated in the manner described above to form the corresponding 6-(N-benzyl - N-alkyl)amino-6,7,8,9-tetrahydro-5H-benzocyclohepten-5-ol and the latter debenzylated catalytic hydrogenation. This latter process is illustrated on the following page.

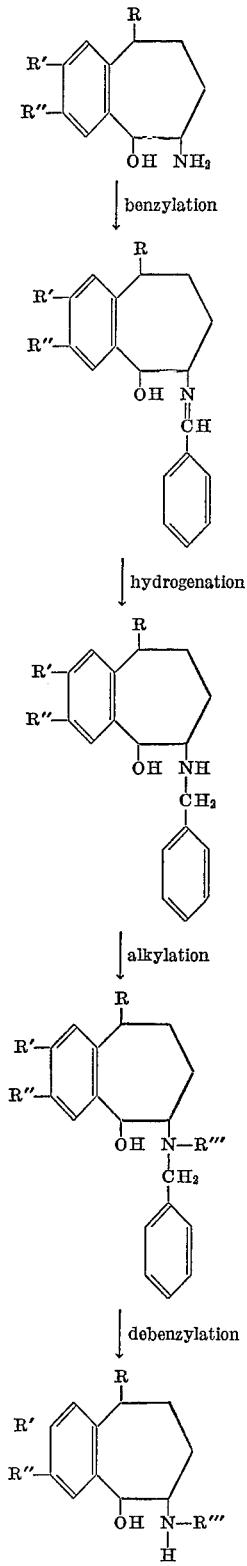

wherein R, R' and R" are as previously defined and R'" is other than hydrogen but as otherwise defined.

As previously indicated hereinabove, the resulting 6-alkylamino - 6,7,8,9 - tetrahydro - 5H - benzocyclohepten-5-ol will be predominantly of the same configuration (cis or trans) as the starting 6-amino-6,7,8,9-tetrahydro-5H-benzocyclohepten-5-ol. The conditions for carrying out the above process as well as the alkylation illustrated by Step 5 of Reaction Sequence I are conventional and well known in the art.

Compounds of Formula I wherein

represent a dialkylamino group may also be prepared by reacting a 6,7,8,9-tetrahydro-5H-benzocyclohepten-5-one with a halogenating agent to form the corresponding 6-halo-6,7,8,9-tetrahydro-5H-benzocyclohepten-5-one, reacting the latter with a dialkylamine to form the corresponding 6-dialkylamino-6,7,8,9-tetrahydro-5H-benzocyclohepten-5-one and reducing the latter. This process may be illustrated as follows:

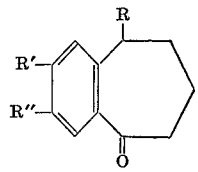

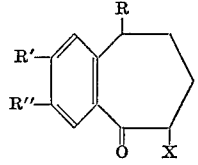

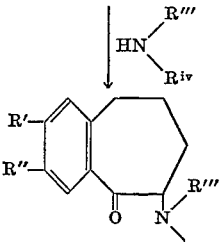

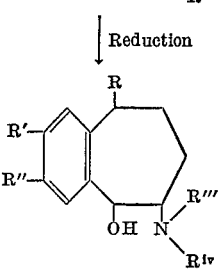

wherein R, R' and R" are as previously defined, R'" and $R^{iv}$ are other than hydrogen but as otherwise defined and X represents halogen, preferably chlorine or bromine.

Halogenation of the 6,7,8,9-tetrahydro-5H-benzocyclohepten-5-one is effected in conventional manner employing a suitable inert organic solvent, e.g., chloroform, carbon tetrachloride, dichloromethane, dioxane and glacial acetic acid, and an appropriate halogenating agent, e.g., bromine, chlorine, N-bromosuccinimide, cupric bromide and the like. The reaction may be carried out at room temperature or below or at an elevated temperature of up to about 100° C. The reaction of the resulting 6-halo derivative with the appropriate secondary amine is carried out in a suitable inert solvent, such as benzene or toluene, and at room temperature or above employing an excess of the amine reactant. The thus-obtained 6-dialkylamino-6,7,8,9-tetrahydro-5H-benzocyclohepten-5-ol is reduced in conventional manner employing sodium borohydride or a catalytic system used for reducing ketones to the corresponding alcohols.

Various of the starting compounds (II) employed herein are known and can be prepared as described in the literature [see, for example, J. Org. Chem. 23, 344 (1958), J. Chem. Soc. 4274 (1964) and Bull. Soc. Chim. France, 1340–1353 (1957)]. Such others which are not specifically known can be prepared from available materials in analogous manner to that described for the preparation of the known compounds.

The compounds of Formula I as well as many of the intermediates described herein exist in the form of geometric and/or optical isomers. Separation and isolation of the respective isomers may be readily accomplished employing conventional techniques and such isomers are included within the scope of this invention.

All of the intermediate compounds described herein are believed to be new with the exception of that compound of Formula III wherein R is hydrogen and R' and R'' are both methoxy, namely, 2,3-dimethoxy-6-isonitroso-6,7,8,9-tetrahydro-5H-benzocyclohepten-5-one, which is described by G. R. Proctor in J. Chem. Soc. 4274 (1964).

The end compounds (I) of the present invention are useful because they have been found to possess pharmacological activity. In particular, such compounds possess anorexigenic activity and can be utilized either therapeutically for the treatment of existing obesity or prophylactically whenever predisposition to obesity exists or where it is desirable for other reasons to reduce caloric intake. The compounds also possess anti-inflammatory activity.

For the above uses, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The compounds may be administered in their free base form or in the form of a pharmaceutically acceptable acid addition salt thereof. Such salts possess the same order of activity as the free base, are readily prepared by reacting the base with the appropriate acid in conventional manner and accordingly are included within the scope of this invention. Representative of such salts are the mineral acid salts, such as the hydrochloride, hydrobromide, phosphate, sulfate and the like, and the organic acid salts such as the tartrate, citrate, salicylate, benzoate, acetate, methanesulfonate, benzenesulfonate, toluenesulfonate and the like.

As noted above, the compounds of Formula I exist as geometric and optical isomers. In some cases greater pharmacological activity or other beneficial attribute may be found with respect to a particular isomer and in such instances administration of such isomer may be preferred.

The dosage employed for the above-mentioned uses will, of course, vary depending upon the compound used, the therapy desired and the mode of administration. However, in general satisfactory results are achieved when administered at a daily dosage of from about 10 mg. to about 150 mg., preferably given in divided doses of from about 2.5 mg. to about 75 mg., two to four times a day or in sustained release form.

A representative formulation is a tablet prepared by conventional tabletting techniques and containing the following ingredients:

| Ingredient: | Parts by weight |
|---|---|
| 6 - amino - 2,3 - dimethoxy - 6,7,8,9 - tetrahydro-5H - benzocyclohepten - 5 - ol (or a pharmaceutically acceptable salt) (as free base) | 50 |
| Tragacanth | 2 |
| Lactose | 39.5 |
| Corn starch | 5 |
| Talcum | 3 |
| Magnesium stearate | 0.5 |

The following examples show representative compounds encompassed within the scope of this invention and the manner in which such compounds are prepared. However, it is to be understood that the examples are for purposes of illustration only and are not intended as in any way limiting the scope of the invention.

EXAMPLE 1 trans-2,3-dimethoxy-6-amino-6,7,8,9-tetrahydro-5H-benzocyclohepten-5-ol

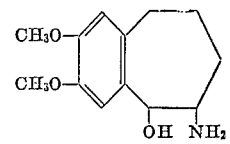

Step A.—Preparation of 2,3-dimethoxy-6-acetamido-6,7,8,9-tetrahydro-5H-benzocyclohepten-5-one A mixture of 133.5 g. of 2,3-dimethoxy-6-isonitroso-6,7,8,9 - tetrahydro - 5H - benzocyclohepten - 5 - one [Proctor, J. Chem. Soc., 4274 (1964)], 800 ml. of acetic anhydride, 600 ml. of glacial acetic acid and 10.0 g. of palladium-charcoal (5%) catalyst is shaken in an autoclave under a hydrogen pressure of 900 p.s.i.g. and at room temperature until the hydrogen uptake ceases. The mixture is then filtered to remove the catalyst and the filtrate evaporated in vacuo. The residue is triturated with diethyl ether to yield 2,3-dimethoxy-6-acetamido-6,7,8,9-tetrahydro-5H-benzocyclohepten-5-one, M.P. 153–154° C.

Step B.—Preparation of 2,3-dimethoxy-6-amino-6,7,8,9-tetrahydro-5H-benzocyclohepten-5-one hydrochloride A solution of 12.0 g. of 2,3-dimethoxy-6-acetamido-6,7,8,9-tetrahydro-5H-benzocyclohepten-5-one in 13.0 ml. of 20% aqueous hydrochloric acid is refluxed for 60 minutes, charcoal treated, then filtered and the filtrate evaporated to dryness. Recrystallization of the residue from ethanol-diethyl ether yields 2,3-dimethoxy - 6 - amino-6,7,8,9-tetrahydro-5H-benzocyclohepten-5-one hydrochloride, M.P. 195–210° (dec.).

Step C.—Preparation of trans-2,3-dimethoxy-6-amino-6,7,8,9-tetrahydro-5H-benzocyclohepten-5-ol A solution of 66 g. of 2,3-dimethoxy-6-amino-6,7,8,9-tetrahydro-5H-benzocyclohepten-5-one hydrochloride in one liter of 50% aqueous ethanol is added, over a period of 6 hours, to a solution of 12.5 g. of sodium hydroxide and 25.0 g. of sodium borohydride in 400 ml. of ethanol maintaining the temperature of the reaction mixture at 0° C. Water and 2 N aqueous hydrochloric acid are then added carefully until the mixture attains a pH of 4. The mixture is then washed with ethyl acetate. The aqueous layer is made strongly alkaline with sodium hydroxide and extracted with chloroform to obtain trans-2,3-dimethoxy - 6 - amino - 6,7,8,9 - tetrahydro - 5H - benzocyclohepten-5-ol as the free base. Crystallization from ethanol affords material, M.P. 158–159° C. The hydrochloride salt thereof, M.P. 207–209° C., is obtained in conventional manner.

EXAMPLE 2 cis-2,3-dimethoxy-6-amino-6,7,8,9-tetrahydro-5H-benzocyclohepten-5-ol

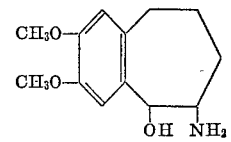

Step A.—Preparation of trans-2,3-dimethoxy-6-acetamido-6,7,8,9-tetrahydro-5H-benzocyclohepten-5-ol A solution of 70 g. of 2,3 - dimethoxy - 6 - acetamido-6,7,8,9-tetrahydro-5H-benzocyclohepten-5-one in 500 ml. of methanol is added, at 0° C., to a solution of 10 g. of sodium borohydride in 500 ml. of methanol. Acetic acid is then carefully added to the mixture to decompose the excess sodium borohydride and the mixture then diluted with water to yield crude trans-2,3-dimethoxy-6-acetamido - 6,7,8,9 - tetrahydro - 5H - benzocyclohepten - 5 - ol. The latter is crystallized from benzene to yield material, M.P. 182.5° C.

Step B.—Preparation of cis-2,3-dimethoxy-6-amino-6,7,8,9-tetrahydro-5H-benzocyclohepten-5-ol A mixture of 23.7 g. of trans-2,3-dimethoxy-6-acetamido - 6,7,8,9 - tetrahydro - 5H - benzocyclohepten - 5-ol and 700 ml. of 1% aqueous hydrochloric acid is refluxed for 1 hour, cooled and washed with three 100 ml. portions of chloroform. The aqueous phase is then made strongly akaline with 5.5 N sodium hydroxide, extracted with chloroform, and the chloroform evaporated. The residue is crystallized from isopropanol to yield 6.9 g. of trans - 2,3 - dimethoxy - 6 - amino - 6,7,8,9 - tetrahydro-5H-benzocyclohepten-5-ol, M.P. 154–157° C. The mother liquor of the crystallization is evaporated to dryness and then crystallized from benzene to yield 9.5 g. of cis-2,3-dimethoxy - 6 - amino - 6,7,8,9 - tetrahydro - 5H - benzocyclohepten-5-ol, M.P. 128–131° C. The hydrochloride salt of the latter, M.P. 230–232° C., is obtained in conventional manner.

EXAMPLE 3

2,3-dimethoxy-6-amino-9-phenyl-6,7,8,9-tetrahydro-5H-benzocyclohepten-5-ol

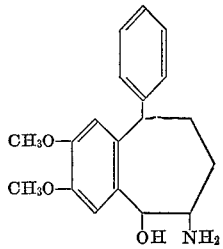

Step A.—Preparation of 2,3-dimethoxy-9-phenyl-6,7,8,9-tetrahydro-5H-benzocyclohepten-5-one To 1200 g. of polyphosphoric acid stirred at 55° C. is added a mixture of 158.2 g. of veratrole and 220 g. of crude δ-phenyl-δ-hydroxyvaleric acid (obtained by reduction of γ-benzoyl-butyric acid with sodium borohydride and containing some of the corresponding lactone) over a period of 15 minutes while maintaining the temperature of the reaction between 60–62° C. After the addition is completed the mixture is maintained at 60° C. for 2 hours, then poured over ice and the resulting mixture vigorously stirred and then extracted with benzene. The benzene extract is then washed with cold 2 N aqueous sodium hydroxide, dried over sodium sulfate and the benzene evaporated. The resulting oil is vacuum distilled to yield 2,3-dimethoxy - 9 - phenyl-6,7,8,9-tetrahydro-5H-benzocyclohepten-5-one, M.P. 81–83° C., B.P. 220° C./20 mm. The same product is obtained if instead of using δ-phenyl-δ-hydroxyvaleric acid the corresponding lactone is employed.

Step B.—Preparation of 2,3-dimethoxy-6-isonitroso-9-phenyl-6,7,8,9-tetrahydro-5H-benzocyclohepten-5-one 2,3-dimethoxy-9-phenyl - 6,7,8,9 -tetrahydro-5H-benzocyclohepten-5-one, 35 g., is added to 600 ml. of diethyl ether and the resulting mixture cooled to 0° C. While stirring, hydrogen chloride gas is then bubbled through the mixture. During the passage of hydrogen chloride gas through the mixture, 22.85 g. of n-butyl nitrite in 100 ml. of diethyl ether is slowly added over 30 minutes. After the addition of the nitrite is completed, the resulting mixture is evaporated to dryness, the residue washed with cold diethyl ether and then dried to yield 2,3-dimethoxy-6-isonitroso-9-phenyl - 6,7,8,9 - tetrahydro-5H-benzocyclohepten-5-one, M.P. 127° C. (dec.).

Step C.—Preparation of 2,3-dimethoxy-6-acetamido-9-phenyl-6,7,8,9-tetrahydro-5H-benzocyclohepten-5-one A mixture of 10.0 g. of 2,3-dimethoxy-6-isonitroso-9-phenyl-6,7,8,9-tetrahydro-5H-benzocyclohepten-5-one, 50 ml. of acetic anhydride, 100 ml. of glacial acetic acid and 10 mg. of mercuric chloride is stirred at 60° C. and 50.0 g. of zinc metal is added thereto over a period of 1 hour. The crude organic product thus obtained is crystallized from methanol to yield 2,3-dimethoxy-6-acetamido-9-phenyl - 6,7,8,9 - tetrahydro-5H-benzocyclohepten-5-one, M.P. 194° C. (dec.).

Step D.—Preparation of 2,3-dimethoxy-6-acetamido-9-phenyl-6,7,8,9-tetrahydro-5H-benzocyclohepten-5-ol A mixture of 12.4 g. of 2,3-dimethoxy-6-acetamido-9-phenyl-6,7,8,9-tetrahydro-5H-benzocyclohepten-5-one, 9.0 g. of sodium borohydride and 400 ml. of methanol is stirred at room temperature for 17 hours. The excess borohydride is then decomposed with 1 N hydrochloric acid. The methanol is then stripped off, water is then added and the resulting mixture made strongly basic with sodium hydroxide and extracted with chloroform. The chloroform solution is dried over sodium sulfate and evaporated to dryness to yield crude 2,3 - dimethoxy-6-acetamido-9-phenyl-6,7,8,9-tetrahydro-5H-benzocyclohepten-5-ol as a foam.

Step E.—Preparation of 2,3-dimethoxy-6-amino-9-phenyl-6,7,8,9-tetrahydro-5H-benzocyclohepten-5-ol A mixture of 12.7 g. of 2,3-dimethoxy-6-acetamido-9-phenyl-6,7,8,9-tetrahydro-5H-benzocyclohepten-5-ol and 200 ml. of 1% aqueous hydrochloric acid is refluxed for 17 hours, then cooled and washed with diethyl ether. The aqueous phase is made strongly basic, extracted with chloroform and the dried chloroform solution evaporated to dryness to yield crude 2,3-dimethoxy-6-amino-9-phenyl-6,7,8,9-tetrahydro-5H-benzocyclohepten-5-ol, M.P. 190–198° C. The crude hydrochloride salt thereof is prepared in conventional manner. The crude salt is crystallized from ethanol-diethyl ether to yield 2,3-dimethoxy-6-amino-9-phenyl-6,7,8,9-tetrahydro-5H-benzocyclohepten-5-ol hydrochloride, M.P. 125–148° C. (dec.).

EXAMPLE 4 trans-2-methoxy-6-amino-6,7,8,9-tetrahydro-5H-benzocyclohepten-5-ol

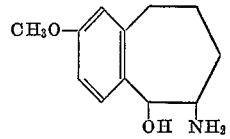

Step A.—Preparation of 2-methoxy-6,7,8,9-tetrahydro-5H-benzocyclohepten-5-one

A solution of 500 g. of m-methoxybenzaldehyde and 600 g. of methyl crotonate in 1000 ml. of tert.-butanol is added over a period of 5 hours to 3670 ml. of a stirred one molar solution of potassium tert.-butylate. Stirring is continued at room temperature, and the mixture then poured onto a mixture of 224 g. of acetic acid and 16 l. of ice water. The resulting mixture is extracted with chloroform and the brown oil thus obtained refluxed with 1100 ml. of 2 N aqueous sodium hydroxide solution. The thus-obtained aqueous solution is washed with benzene and then hydrogenated with 50 g. of Raney nickel catalyst at 90–100° C. and under 1500 p.s.i.g. hydrogen pressure. The catalyst is then filtered off, the filtrate acidified to pH 2 with hydrochloric acid and extracted with chloroform. The chloroform extract is dried over sodium sulfate and evaported. The resulting oil is distilled in vacuo to yield δ-(m-methoxyphenyl)-valeric acid, M.P. 54–57° C., B.P. 156–166° C./0.3 mm. The latter is stirred with 4200 g. of polyphosphoric acid for 15 minutes at 65–70° C. and the mixture then poured on ice and the organic phase extracted with benzene. The benzene solution is evaporated to remove the benzene and the residue distilled to yield 2 - methoxy-6,7,8,9-tetrahydro-5H-benzocyclohepten-5-one, M.P. 54–56° C., B.P. 118–122° C./ 0.5 mm.

Step B.—Preparation of 2-methoxy-6-isonitroso-6,7,8,9-tetrahydro-5H-benzocyclohepten-5-one A suspension of 30.0 g. of 2-methoxy-6,7,8,9-tetrahydro-5H-benzocyclohepten-5-one in 150 ml. of dry diethyl ether is stirred at 5–10° C. Hydrogen chloride gas is then bubbled through the suspension and at the same time 20.6 g. of n-butyl nitrite in 100 ml. of diethyl ether is added over a period of 15 minutes. The yellow solid which separates is collected by filtration, washed with diethyl ether and then several times with cold water to yield 2-methoxy-6-isonitroso-6,7,8,9-tetrahydro - 5H - benzocyclohepten-5-one, M.P. 171–173° C.

Step C.—Preparation of 2-methoxy-6-acetamido-6,7,8,9-tetrahydro-5H-benzocyclohepten-5-one A mixture of 27.5 g. of 2-methoxy-6-isonitroso-6,7,8,9-tetrahydro-5H-benzocyclohepten-5-one, 5 g. of palladium-carbon, 200 ml. of acetic anhydride and 150 ml. of acetic acid is hydrogenated at room temperature and under 900 p.s.i.g. hydrogen pressure to yield 2-methoxy-6-acetamido-6,7,8,9-tetrahydro - 5H - benzocyclohepten-5-one, M.P. 146° C.

Step D.—Preparation of 2-methoxy-6-amino-6,7,8,9-tetrahydro-5H-benzocyclohepten-5-one hydrochloride 2 - methoxy-6-acetamido-6,7,8,9-tetrahydro-5H-benzocyclohepten-5-one, 22 g., is refluxed with 184 ml. of 6 N hydrochloric acid for 60 minutes. The mixture is then cooled, filtered and the filtrate evaporated to dryness. The residue is recrystallized from ethanol-diethyl ether to yield 2-methoxy-6-amino-6,7,8,9-tetrahydro - 5H - benzocyclohepten-5-one hydrochloride, M.P. 187°–189° C.

Step E.—Preparation of trans-2-methoxy-6-amino-6,7,8,9-tetrahydro-5H-benzocyclohepten-5-ol A solution of 16.0 g. of 2-methoxy-6-amino-6,7,8,9-tetrahydro-5H-benzocyclohepten-5-one hydrochloride in 200 ml. of 50% aqueous ethanol is added over 6 hours to a stirred suspension of 3.68 g. of sodium borohydride and 5.57 g. of sodium carbonate in 30 ml. of water. The excess borohydride is decomposed by careful acidification of the mixture to pH 3 and the acidified mixture then washed with diethyl ether and then made alkaline to precipitate trans-2-methoxy-6-amino-6,7,8,9-tetrahydro - 5H-benzocyclohepten-5-ol, M.P. 133–134° C. Additional material is obtained by extracting the basic aqueous filtrate with chloroform. The methanesulfonate salt thereof, M.P. 155–157° C., is prepared in conventional manner.

EXAMPLE 5 trans-2-methoxy-6-isopropylamino-6,7,8,9-tetrahydro-5H-benzocyclohepten-5-ol

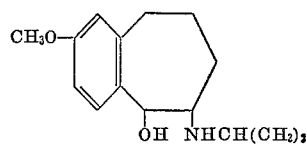

A mixture of trans-2-methoxy-6-amino-6,7,8,9-tetrahydro-5H-benzocyclohepten-5-ol, 4.8 g. of acetone and 140 ml. of ethanol is hydrogenated at room temperature under 50 p.s.i.g. hydrogen pressure and in the presence of a platinum catalyst. After the hydrogen pressure and in the presence of a platinum catalyst. After the hydrogen uptake ceases, the catalyst is filtered off and the filtrate evaporated to yield an oil. The latter is dissolved in diethyl ether and the resulting solution treated with ethereal hydrogen chloride to yield trans-2-methoxy-6-isopropylamino - 6,7,8,9-tetrahydro-5H-benzocyclohepten-5-ol hydrochloride, M.P. 223° C.

EXAMPLE 6 trans-2,3-dimethoxy-6-dimethylamino-6,7,8,9-tetrahydro-5H-benzocyclohepten-5-ol

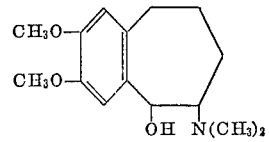

A mixture of 118 mg. of trans-2,3-dimethoxy-6-amino-6,7,8,9-tetrahydro-5H-benzocyclohepten-5-ol, 0.2 ml. of 90% formic acid and 0.12 ml. of 37% formaldehyde solution is heated for 90 minutes at 80–90° C. The mixture is then cooled and 0.1 ml. of concentrated hydrochloric acid is added. The resulting mixture is evaporated in vacuo and the residue recrystallized from ethanol-diethyl ether to yield crude trans-2,3-dimethoxy-6-dimethylamino - 6,7,8,9-tetrahydro-5H-benzocyclohepten-5-ol hydrochloride, M.P. 132°–143° C.

EXAMPLE 7

2,3-dimethoxy-6-diethylamino-6,7,8,9-tetrahydro-5H-benzocyclohepten-5-ol

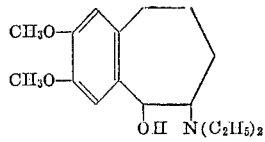

Step A.—Preparation of 2,3-dimethoxy-6-bromo-6,7,8,9-tetrahydro-5H-benzocyclohepten-5-one A mixture of 1.93 g. of 2,3-dimethoxy-6,7,8,9-tetrahydro-5H-benzocyclohepten-5-one, 2.03 g. of cupric bromide and 25 ml. of dioxane is refluxed for 1 hour, then poured into a solution of 2 g. of potassium bromide in 50 ml. of water. The resulting mixture is extracted with chloroform and the chloroform solution evaporated. The oily residue thus obtained is stirred with a mixture of petroleum ether and diethyl ether and the resulting unsoluble residue recovered and recrystallized from ethyl acetate to obtain 2,3-dimethoxy-6-bromo-6,7,8,9-tetrahydro-5H-benzocyclohepten-5-one, M.P. 128–129° C.

Step B.—Preparation of 2,3-dimethoxy-6-diethylamino-6,7,8,9-tetrahydro - 5H - benzocyclohepten-5-one hydrochloride To a solution of 3 g. of 2,3-dimethoxy-6-bromo-6,7,8,9-tetrahydro-5H-benzocyclohepten-5-one in 30 ml. of benzene is added a solution of 5 g. of diethylamine in 50 ml. of benzene. After the reaction is completed, the mixture is evaporated to dryness, the residue dissolved in diethyl ether and the ether solution filtered to remove any undissolved salts. The filtrate is treated with ethereal hydrogen chloride to obtain 2,3-dimethoxy-6-diethylamino-6,7,8,9-tetrahydro-5H-benzocyclohepten-5-one hydrochloride.

Step C.—Preparation of trans-2,3-dimethoxy-6-diethylamino-6,7,8,9-tetrahydro-5H-benzocyclohepten-5-ol A solution of 1.5 g. of 2,3-dimethoxy-6-diethylamino-6,7,8,9-tetrahydro-5H-benzocyclohepten-5-one hydrochloride in 20 ml. of dioxane is added dropwise, at 5° C., to a stirred mixture of 0.3 g. of sodium borohydride in 10 ml. of 1:1 mixture of dioxane and ethanol. To the mixture is then added 6 ml. of 2 N hydrochloric acid and the resulting mixture evaporated in vacuo. To the thus-obtained residue is added diethyl ether and 10 ml. of 2 N sodium hydroxide. The separated ether layer is dried and treated with ethereal hydrogen chloride solution to obtain trans-2,3-dimethoxy-6-diethylamino - 6,7,8,9 - tetrahydro-5H-benzocyclohepten-5-ol hydrochloride.

EXAMPLE 8

2,3-dimethoxy-6-methylamino-6,7,8,9-tetrahydro-5H-benzocyclohepten-5-ol

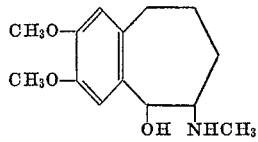

Step A.—Preparation of trans-2,3-dimethoxy-6-benzylideneamino-6,7,8,9-tetrahydro-5H-benzocyclohepten-5-ol A mixture of 9.4 g. of trans-2,3-dimethoxy-6-amino-6,7,8,9-tetrahydro-5H-benzocyclohepten-5-ol, 4.2 g. of benzaldehyde, 0.01 g. of piperidine and 60 ml. of ethanol is refluxed for 4 hours, then poured into ice water and the resulting product filtered off to obtain trans-2,3-dimethoxy-6-benzylideneamino-6,7,8,9-tetrahydro - 5H-benzocyclohepten-5-ol.

Step B.—Preparation of trans-2,3-dimethoxy-6-benzylamino-6,7,8,9-tetrahydro-5H-benzocyclohepten-5-ol The benzylideneamino derivative obtained in Step A is dissolved in 300 ml. of dioxane and the resulting solution hydrogenated in the presence of Raney nickel catalyst until one equivalent of hydrogen is taken up. The resulting mixture is then filtered to remove the catalyst and the filtrate evaporated to dryness. The residue is triturated with ether and the product filtered off to obtain trans-2,3-dimethoxy-6-benzylamino - 6,7,8,9 - tetrahydro - 5H - benzocyclohepten-5-ol.

Step C.—Preparation of trans-2,3-dimethoxy-6-(N-benzyl-N-methylamino)-6,7,8,9 - tetrahydro - 5H - benzocyclohepten-5-ol A mixture of the benzylamino derivative obtained in Step B, 6.75 ml. of 85% formic acid, 2.40 ml. of 40% aqueous formaldehyde solution is boiled for 4 hours, then cooled, treated with 2 ml. of 11 N hydrochloric acid and evaporated to dryness. The residue is treated with 10% aqueous sodium carbonate solution and the mixture extracted with chloroform. The chloroform layer is evaporated to yield trans-2,3-dimethoxy-6-(N-benzyl-N-methylamino)-6,7,8,9-tetrahydro-5H-benzocyclohepten - 5 - ol. The free base is converted to the hydrochloride salt in conventional manner.

Step D.—Preparation of trans-2,3-dimethoxy - 6 - methylamino-6,7,8,9-tetrahydro-5H-benzocyclohepten-5-ol The trans-2,3-dimethoxy-6-(N-benzyl-N-methylamino)-6,7,8,9-tetrahydro-5H-benzocyclohepten-5 - ol hydrochloride obtained in Step C in 300 ml. of ethanol is hydrogenated at 40° C. and 50 p.s.i.g. hydrogen pressure in the presence of 10% palladium-carbon catalyst. After one equivalent of hydrogen is taken up, the catalyst is filtered off and the filtrate evaporated to dryness to yield trans-2,3-dimethoxy-6-methylamino-6,7,8,9-tetrahydro - 5H - benzocyclohepten-5-ol hydrochloride.

EXAMPLE 9

6-dimethylamino-9-phenyl-6,7,8,9-tetrahydro-5H-benzocyclohepten-5-ol

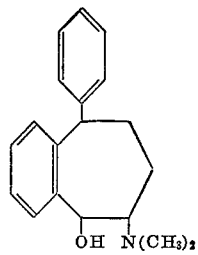

Step A.—Preparation of 6-isonitroso-9 - phenyl - 6,7,8,9-tetrahydro-5H-benzocyclohepten-5-one 9-phenyl-6,7,8,9-tetrahydro - 5H - benzocyclohepten - 5-one, 11.5 g., is added to 170 ml. of a 1:1 mixture of benzene and diethyl ether and the resulting mixture cooled to 0° C. While stirring, hydrogen chloride gas is then bubbled through the mixture. During the passage of hydrogen chloride gas through the mixture, 4.84 g. of n-butyl nitrite is slowly added over 45 minutes. The resulting solid material is filtered off, washed with petroleum ether and recrystallized from benzene to yield 6-isonitroso-9-phenyl-6,7,8,9-tetrahydro-5H-benzocyclohepten-5-one, M.P. 174–176° C.

Step B.—Preparation of 6-amino-9-phenyl-6,7,8,9-tetrahydro-5H-benzocyclopheten-5-ol A mixture of 8.1 g. of 6-isonitroso-9-phenyl-6,7,8,9-tetrahydro-5H-benzocyclohepten-5-one, 50 g. of sodium hydroxide, 700 ml. of methanol and 5 g. of Raney nickel is shaken at room temperature in a hydrogen atmosphere of 760 p.s.i.g. for 17 hours. The catalyst is then filtered off and the filtrate evaporated to dryness. The residue is extracted with chloroform and the chloroform layer washed with water, dried over sodium sulfate and evaporated to dryness to yield crude 6-amino-9-phenyl-6,7,8,9-tetrahydro-5H-benzocyclohepten-5-ol, M.P. 135–165° C.

Step C.—Preparation of 6-dimethylamino-9-phenyl-6,7,8,9-tetrahydro-5H-benzocyclohepten-5-ol A mixture of 8.0 g. of 6-amino-9-phenyl-6,7,8,9-tetrahydro-5H-benzocyclohepten-5-ol, 10.1 g. of formic acid and 7.9 g. of 40% formaldehyde solution is kept in an oil bath at 140° C. for 45 minutes and then cooled to room temperature. To the cooled mixture is then added 2 ml. of concentrated hydrochloric acid and the acidified mixture evaporated to dryness. The residue is recrystallized from ethanol-diethyl ether to yield 6-dimethylamino-9-phenyl-6,7,8,9-tetrahydro-5H-benzocyclohepten - 5 - ol hydrochloride, M.P. 180° C. (dec.). The free base, M.P. 200–210°, is obtained from the hydrochloride salt in conventional manner.

What is claimed is:

1. A compound selected from the group consisting of those of the formula

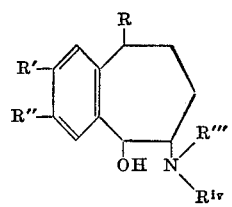

and pharmaceutically acceptable acid addition salts thereof wherein

R represents hydrogen, phenyl or p-chlorophenyl;

R' and R" each independently represent hydrogen or alkoxy containing from 1 to 4 carbon atoms; and R''' and $R^{iv}$ each independently represent hydrogen or alkyl containing from 1 to 4 carbon atoms.

2. The compound of claim 1 which is 6-dimethylamino-9-phenyl-6,7,8,9-tetrahydro-5H-benzocyclohepten-5-ol.

3. The compound of claim 1 which is 2,3-dimethoxy-6-amino-9-phenyl-6,7,8,9-tetrahydro-5H - benzocyclohepten-5-ol.

4. The compound of claim 1 which is 2,3-dimethoxy-6-amino-6,7,8,9-tetrahydro-5H-benzocyclohepten-5-ol.

5. The compound of claim 1 which is trans-2,3-dimethoxy-6-amino-6,7,8,9-tetrahydro - 5H - benzocyclohepten-5-ol.

6. The compound of claim 1 which is cis-2,3-dimethoxy-6-amino-6,7,8,9-tetrahydro-5H-benzocyclohepten-5-ol.

7. The compound of claim 1 which is 2-methoxy-6-amino-6,7,8,9-tetrahydro-5H-benzocyclohepten-5-ol.

8. The compound of claim 1 which is 2-methoxy-6-isopropylamino-6,7,8,9-tetrahydro - 5H - benzocyclohepten-5-ol.

9. The compound of claim 1 which is 2,3-dimethoxy-6-dimethylamino-6,7,8,9 - tetrahydro - 5H - benzocyclohepten-5-ol.

References Cited

Smith et al., J. Org. Chem., January 1961, pp. 27–36, vol. 26.

Dvolaitzky et al., Helv. Chim. Acta., vol. 48, 1965, pp. 1988–1998.

CHARLES B. PARKER, Primary Examiner

PATRICIA C. IVES, Assistant Examiner

U.S. Cl. X.R.

260—501.1, 501.21, 562, 566, 570.9, 574, 575, 590; 424—316, 324, 327, 330